Nov. 6, 1956  H. D. BRAILSFORD  2,769,339
RELATIVE HUMIDITY INDICATING AND RECORDING APPARATUS
Filed April 24, 1953  2 Sheets-Sheet 1
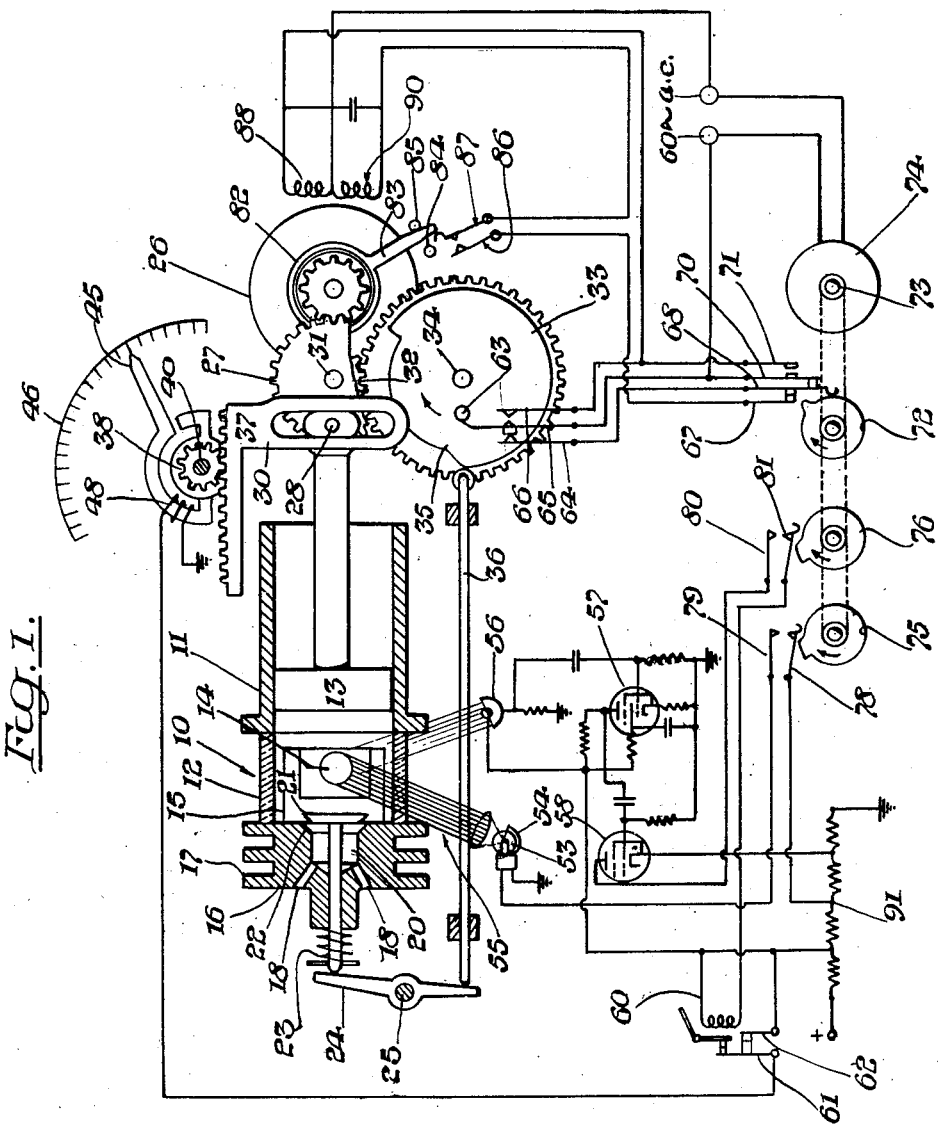
INVENTOR.
Harrison D. Brailsford
BY Darly & Darly
ATTORNEYS.

Nov. 6, 1956     H. D. BRAILSFORD     2,769,339
RELATIVE HUMIDITY INDICATING AND RECORDING APPARATUS
Filed April 24, 1953     2 Sheets-Sheet 2
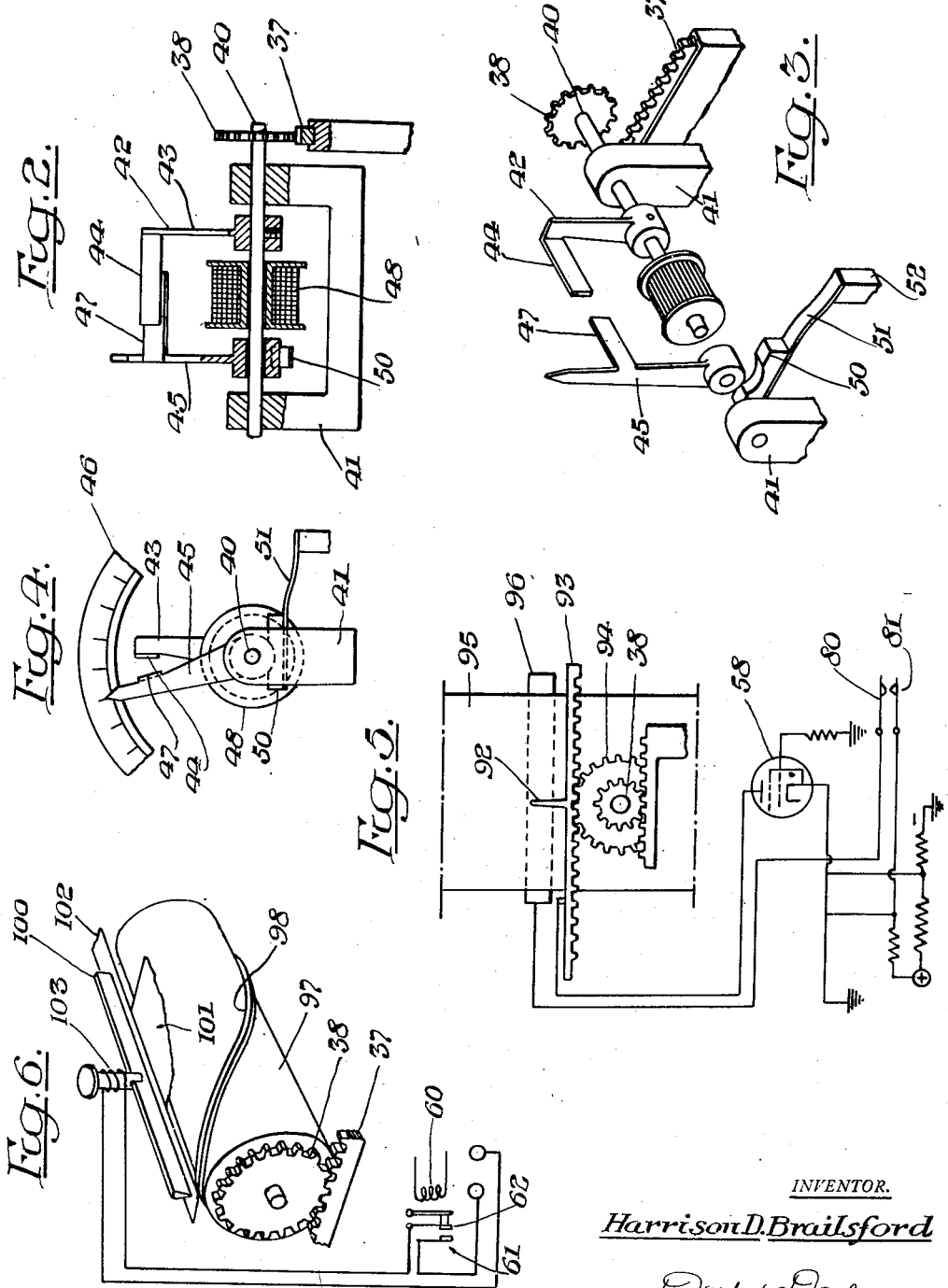
INVENTOR.
Harrison D. Brailsford
BY Darby & Darby
ATTORNEYS.

United States Patent Office 2,769,339
Patented Nov. 6, 1956

2,769,339

RELATIVE HUMIDITY INDICATING AND RECORDING APPARATUS

Harrison D. Brailsford, Rye, N. Y.

Application April 24, 1953, Serial No. 350,854

12 Claims. (Cl. 73—335)

The present invention relates to apparatus for indicating or recording relative humidity. More particularly the invention relates to apparatus operating upon the elementary principle that if a sample of air or other gas containing water vapor is compressed the point will be reached where saturation occurs provided that adiabatic heating can be prevented. A manually operated device operated upon this principle is disclosed in patent application Serial No. 233,360, filed April 2, 1952 in the name of James M. Brady, and assigned to the present applicant now Patent No. 2,715,836.

The present invention is an improvement upon that of the Brady application and provides means for periodically causing a sample to be taken into a compression cylinder and, after a plurality of strokes of the piston in order to scavenge the cylinder, compressing the sample and recording or indicating the position of the piston at the time when water vapor appears on a metal mirror which is located within the cylinder but is maintained at substantially the temperature of the ambient air.

In brief, the instrument comprises a metal cylinder having an end section of glass or other transparent material and having a piston operating therein. The cylinder head contains a pressure relief valve and a metal mirror is supported on a bracket from the cylinder head in a position such that it may be seen through the transparent cylinder wall. The piston is driven by an electric motor through gearing, and electrical switches are provided to cause the piston to make a plurality of strokes following which the relief valve is closed and a pointer means caused to indicate the point in the compression cycle at which water vapor begins to form on the mirror. Electrical circuits including a photoelectric cell and a thyratron tube are provided to cause the pointer to maintain its position despite additional movement of the piston so that the pointer will indicate the exact degree of humidity since it will indicate the degree of compression at which water vapor began to form.

It is an object of the invention to provide a hygrometer for the quantitative determination of relative humidity of water or other vapor in air or other gases.

It is another object of the invention to provide such a hygrometer which is automatically periodically actuated to indicate and to record the relative humidity of a sample of the surrounding atmosphere.

It is a further object of the invention to provide such an automatic and periodically operating hygrometer in which the formation of water vapor on a mirror in a compression cylinder causes the release of certain mechanism to provide a reading directly indicative of relative humidity.

Other objects and features of the invention will be apparent when the following description is considered in connection with the annexed drawings, in which, Figure 1 is a cross-sectional view of a compression hygrometer in accordance with my invention showing schematically the controlling circuits causing operation of the piston and showing likewise the additional control circuits for operating an indicator of relative humidity;

Figure 2 is a side elevation, partly in section, of the indicator shown schematically in Figure 1;

Figure 3 is an exploded perspective view of the indicator of Figure 2;

Figure 4 is an end elevation of indicator of Figures 2 and 3;

Figure 5 is a top plan view of one form of recorder for use with the instrument of Figure 1; and Figure 6 is a perspective view of another form of recorder suitable for use with the instrument and circuits of Figure 1.

Referring now to the drawings and particularly to Figure 1, there is shown at 10 a cylinder composed of two sections 11 and 12. The portion 11, in which a piston 13 moves, is made of metal or other suitable material capable of being machined to sufficiently close tolerances so that the piston may be a sliding but leakproof fit in the cylinder. The section 12 of the cylinder is made of glass or other transparent material in order that a light beam may be transmitted to and reflected from a mirror 14 which mirror is mounted on the cylinder head 16 through the medium of the bracket 15. The cylinder head 16 is preferably made of brass, copper or other material having a high heat conductivity and is provided with fins 17 in order to increase the heat transfer between the cylinder head and the surrounding medium thereby maintaining the cylinder head and the mirror 14 at the ambient temperature of the surrounding medium.

Passages 18 in the cylinder head 16 communicate with a chamber 20 which in turn communicates with the interior of the cylinder 10, there being a valve 21 cooperating with valve seat 22 to close the cylinder at desired moments. The valve 21 is normally held in its closed position by means of the coil spring 23 mounted on the valve stem. A rocker arm 24 pivoted in any suitable manner at the point 25 bears against the valve stem and serves to open the valve in order to permit ingress of a fresh sample of air or gas.

The piston 13 is driven by means of an electric motor 26. Motor 26 operates a gear 27 which, through a Scotch yoke comprising the parts 28 and 30, drives the piston 13. Gear 27 is mounted on a shaft 31 and has connected thereto a pinion 32 which in turn drives a gear 33 mounted on the shaft 34. Also mounted on the shaft 34 is a cam 35 which controls the movement of a push rod 36 bearing against the end of the rocker arm 24 remote from the stem of the valve 21. It will thus be seen that as the motor rotates it drives the piston back and forth in the cylinder 10 and also periodically causes the valve 21 to open and close. The gear ratios are such that the piston, in the present instance, moves from its initial position which is at the top of its compression stroke to the bottom of its stroke three times after which the cam 35 causes closing of the valve 21 followed by a completion of the third stroke and stopping of the piston in the position shown. The mode of effecting this manner of operation will be described below.

Fixed to the piston 13 for movement therewith or more accurately fixed to the portion 30 of the Scotch yoke is a rack 37. This rack drives a pinion 38 mounted on the shaft 40 (see Figures 2, 3 and 4). Shaft 40 is mounted for rotation in a suitable bracket 41, the bracket being provided with the usual bushings in its upturned arms. Fixed to the shaft 40 is a member 42 comprising the radially extending arm 43 and the axially extending lug 44. All parts of member 42 are made of soft iron.

Mounted for rotation on the shaft is an indicating pointer 45 which pointer cooperates with a scale 46 (see Figures 1 and 4). Extending axially from pointer 45 is a lug 47 which lies in the path of the lug 44 on member 42. All parts of indicator 45, including the hub thereof and the lug 47, are made of soft iron.

Loosely mounted on shaft 40 between the hub portions of member 42 and indicator 45 is an electromagnetic coil 48 of usual type. Cooperating with the hub portion of the indicator 45 is a brake shoe 50 which is held against the hub by means of the leaf spring 51, this spring being mounted in any suitable manner upon a fixed portion 52 of the device.

An electrical circuit is provided to cause energization and de-energization of the coil 48 at desired moments. These circuits include a lamp 53 provided with a reflector 54, the lamp throwing a beam of light indicated by the reference numeral 55 upon the mirror 14 by which it is reflected upon a photoelectric cell 56. The output of the photoelectric cell is amplified by means of the amplifier 57 and the output of the amplifier is applied to the control grid of a thyratron tube 58. The thyratron tube 58 in turn controls the flow of current through the winding of a relay 60, the contacts 61 and 62 of which are in the circuit of the electromagnetic winding 48.

In addition to providing the cam surface for controlling the operation of the push rod 36, cam 35 is provided with a stud 63 which controls the opening and closing of switching contacts 64, 65, 66, the contact 65 having a feeler, as shown, to be engaged by stud 63.

Additional switching contacts 67, 68, 70 and 71 are controlled by a cam 72 mounted on the shaft 73 of a clock motor 74. Also mounted on the shaft of the motor 74 are the cams 75 and 76. Contacts 78 and 79 cooperate with cam 75 and cause the lamp 53 to be energized and de-energized. Contacts 80 and 81 cooperate with the cam 76 to apply and remove plate voltage for the thyratron 58.

Mounted on the shaft of the main driving motor 26 is a friction sleeve 82 which sleeve has a lug 83 extending outwardly therefrom the lug being limited in movement by means of the studs 84 and 85 mounted in any suitable manner on a fixed portion of the device such for example as the motor frame. The lug 83 cooperates with an additional pair of contacts 86 and 87 which serve to de-energize the winding of the motor 26 at suitable moments as will appear hereinafter when the operation of the device is described.

Motor 26 is provided with the windings 88 and 90 in order that the direction of rotation of the motor may be reversed.

As has been stated the device operates automatically at predetermined intervals and at each operation goes through a definite cycle which exhausts the old sample from the cylinder 10 (the piston going through enough strokes with the valve open so that complete scavenging is assured), draws in a new sample, compresses the new sample, indicates the point during the compression stroke at which moisture appears on the mirror, and stops. In describing in detail the operation above outlined reference will be made to Figure 1, the positions in which the various parts are shown in Figure 1 being the normal at-rest position with the clock so positioned that a cycle of operation will shortly occur.

As shown in Figure 1 the piston 13 is at the end of its compression stroke and a valve 21 is open. As the clock motor 74 continues to run, since it is connected to the source of 60-cycle alternating current power as indicated, the cams 72, 75 and 76 thereon cause closure of the contacts respectively operated thereby. When cam 72 causes operation of the associated contacts, contacts 67 and 68 are opened and contacts 70 and 71 closed. At this time the cam 35 is positioned so that the stud 63 thereon holds contacts 65 and 66 open and contacts 64, 65 closed. Therefore a circuit is completed from the power source over contacts 70 and 71 to the motor winding 88 and through that winding to the opposite terminal of the power source. The motor immediately starts to rotate in a clockwise direction resulting in counterclockwise rotation of gear 27 and clockwise rotation of the cam 35. Cams 75 and 76 cause closing of contacts 78, 79 and 80, 81 at substantially the same time as contacts 70 and 71 are closed. Closure of contacts 78 and 79 completes a circuit from the direct current voltage divider 91 to the lamp 53 which then lights. Closure of contacts 80 and 81 completes a circuit from voltage divider 91 to the plate of the thyratron tube 58. The amplifier 57 and thyratron 58 are, however, so adjusted that the light reflected upon the photocell from the mirror 14 keeps the circuit balanced and no current flows through the winding of relay 60.

As the motor 26 continues to rotate stud 63 moves out of the path of contact 65 permitting contacts 64 and 65 to open and contacts 65 and 66 to close. This closes the circuit from the alternating current source to winding 88 of the motor 26 the closing being momentarily ineffective since contacts 70 and 71 are also closed. Shortly after this, however, cam 72 moves beyond the operating position as respects contacts 67, 68 and 70, 71, and then the only completion of the circuit to the winding 88 is through contacts 65, 66. As the motor 26 continues its rotation the piston 13 moves to the right and since the rack 37 moves therewith the indicating pointer 45 moves over the scale 46 to its extreme counterclockwise position. The motor 26 continues its rotation until the piston has made five full strokes, that is, three exhaust strokes and two intervening compression strokes. During these movements of the piston the rack 37 causes the pointer to move correspondingly over the scale.

As the piston starts its third compression stroke cam 33 permits valve spring 23 to close the valve 21 and the sample of air or other gas then in the cylinder 10 is compressed. At some point during this third compression stroke moisture will form on the mirror 14 resulting in a diminished amount of light reaching the photocell 56. This lesser amount of light unbalances the amplifier-thyratron circuit and causes relay 60 to be energized. The operation of relay 60 causes opening of the contacts 61 and 62 and de-energization of winding 48. Therefore the pointer 45 stops at a point on the scale corresponding to the position of the piston when moisture began to form on the mirror. As the piston continues to travel toward the left, as seen in Figure 1, to complete its compression stroke, the rack 37 likewise continues to move to the left and the arm 43 moves to the left. However, due to the de-energization of the coil 48 the magnetic circuit extending through shaft 40, pointer 45, lugs 47 and 44, and arm 43, back to the shaft 40 is broken and the pointer 45 is brought to a stop by the brake 50 despite the continued travel of the piston 13 and rack 37. As the piston 13 nears the top of this third compression stroke the stud 63 again makes contact with contact 65 causing opening of contacts 65, 66 and closure of contacts 64, 65. Due to the opening of contacts 65, 66 the circuit to motor winding 88 is broken and as the result of closure of contacts 64, 65 a circuit is completed from the source over contacts 64, 65, contacts 68, 67 and contacts 86, 87 through motor winding 90 to the other terminal of the source. The completion of the last mentioned circuit causes reversal of direction of operation of motor 26. Immediately upon reversing the friction sleeve 82 drives the arm 83 in a counterclockwise direction which permits spring contact 87 to separate from contact 86 causing the motor 26 to stop.

Shortly after the stopping of motor 26, as above-described, cams 75 and 76 will reach a point in their clockwise rotation at which contacts 78, 79 and 80, 81 will again open thus extinguishing the lamp 53 and removing plate battery from the plate of thyratron 58. At this time the parts will have returned to the position shown in Figure 1 and the equipment will remain idle until a period of time has passed during which the clock motor 74 rotates the cams 72, 75 and 76 to positions to again close the contacts respectively associated therewith at which time the cycle of operations above-described will be repeated.

The clock motor may be connected to the shaft 73 through any suitable gearing so that the intervals between cycling of the hygrometer apparatus may be predetermined. Additionally, the gear ratio between the motor 26 and the gear 27 may be adjusted to provide any desired number of strokes of the piston 13 during the cycling operation of the motor 26. As shown in Figure 1, the gear ratio is 3 to 1 providing for three complete cycles of reciprocation of the piston 13 at each operation, the operations being at intervals of one hour, it being assumed that the shaft 73 is the hour hand shaft of the clock.

It will be clear also from the above description that the pointer 45 indicates relative humidity directly since the scale 46 may readily be calibrated to read directly in relative humidity. However, the pointer merely indicates the relative humidity and no record is made thereof although the setting is retained until the next periodic cycling of the device.

Although the foregoing has described the use of a mirror and a light beam reflected from the mirror to a photoelectric cell, the same results may be obtained by utilizing other modes of determining the point in the compression stroke at which water vapor appears.

Referring now to Figures 5 and 6, I have shown therein two alternative manners of recording the relative humidity readings of the instrument. Either one of these mechanisms may be utilized either alone or in conjunction with the indicator heretofore described. The device shown in Figure 5 comprises a stylus 92 formed integrally with a rack 93, the rack 93 being driven by means of a gear 94 formed integrally with the pinion 38. Thus the stylus 92 moves transversely across a paper strip 95 which is fed by means of a metallic platen 96. With this arrangement the thyratron plate circuit extends to the rack 93 and the platen 96 instead of to the terminals of a relay 60. Thus when the thyratron fires a voltage is applied through the paper from the stylus 92 to the platen 96.

The paper of which the strip or chart 95 is made is electrically conductive and of a type particularly designed for recording purposes. Such papers are well-known in the industry and "Teledeltos" is an example. Thus the passage of current through the paper causes a mark to be printed on the chart at the point occupied by the stylus at the instant of actuation. Since the chart 95 may obviously be driven synchronously with the clock 74 the successive marks on the chart will indicate the successive periodic readings taken by the instrument.

Another modification of recording type instrument is shown in Figure 6. In this case a platen 97 is driven by the gear 38 and rack 37. The platen 97 has a spiral rib 98 formed thereon. Mounted above the platen and extending axially thereof is a tapper bar 100. Between the tapper bar 100 and the platen 97 a piece of chart paper 101 and an inking ribbon 102 are placed. Tapper bar 100 is arranged to be moved downwardly against the spiral rib 98 by means of a solenoid winding 103. The solenoid is connected as indicated in Figure 6 directly to one terminal of the electrical current power source and through contacts 61 and 62 of relay 60 to the other terminal of the power source. Relay 60 is modified so that contacts 61 and 62 are normally open rather than normally closed and therefore upon firing of the thyratron tube 58 and consequent energization of winding 60 the solenoid 103 is momentarily energized. This causes a dot to be printed on the chart paper 101 at the point of intersection of the longitudinally extending tapper bar 100 with the spiral rib 98.

As in the form of Figure 5 the chart paper 101 may be driven in any suitable manner at a constant rate so that the successive records thereon are spaced apart a distance proportional to the time interval between readings.

While I have described preferred embodiments of my invention and various modifications of specific features thereof, it will be understood that many other modifications may be made within the scope of my invention. I wish, therefore, to be limited not by the foregoing description but on the contrary solely by the claims granted to me.

What is claimed is:

1. In a device for automatically indicating the relative humidity of a gaseous atmosphere, the combination comprising a compression cylinder having a light transmitting aperture in its wall, a piston reciprocable in said cylinder, a mirror mounted in said cylinder in alignment with said aperture, means for maintaining said mirror at ambient air temperature, an intake and exhaust valve for said cylinder, automatic means for reciprocating said piston in said cylinder through a predetermined cycle of intake, compression and exhaust strokes, means actuated by said automatic means to hold said valve open and to close it upon the commencement of the last compression stroke of said cycle, indicating means, means for coupling said indicating means with said piston for actuation therewith, and photoelectric control means responsive to light reflected from said mirror through said aperture for deactivating said coupling means upon the formation of moisture upon said mirror.

2. A device as claimed in claim 1, characterized in that said automatic means includes an electric motor and cam actuated means operated by said motor for stopping said motor upon completion of said last compression stroke.

3. In the combination of claim 1, said photoelectric control means including a source of light and means for directing the light from said source through said aperture onto said mirror.

4. In the combination of claim 1, said automatic means including a power circuit and time controlled means for completing said power circuit at predetermined intervals to effect operation of the device through said cycle at predetermined intervals.

5. A device as claimed in claim 1, characterized in that said photoelectric control means comprises a photoelectric cell, an amplifier connected in the output of said cell, a thyratron tube controlled by said amplifier and a relay connected in the output of said thyratron tube and operated thereby.

6. A device as claimed in claim 1, characterized in that the means for controlling the opening and closing of said valve comprises a cam driven by said electric motor.

7. In the combination of claim 5, a power circuit for energizing said light source, said photocell amplifier and thyratron, said automatic means and said coupling means, and means to initiate a cycle of operation, said last means being operable upon completion of said cycle to deenergize said light source photoelectric cell amplifier and thyratron.

8. In the combination of claim 2, said electric motor being reversible and having a friction sleeve, a power circuit for said motor, said cam-actuated means including a motor reversing switch in said circuit and contacts held closed by said friction sleeve while the motor operates in one direction, said contacts opening upon reversal of said motor.

9. In a device for automatically indicating the relative humidity of a gaseous atmosphere, in combination, a compression cylinder, a piston reciprocable in said cylinder, a transparent section in said cylinder out of the path of travel of said piston, a metal closure for one end of said cylinder, a mirror mounted in said cylinder in alignment with said transparent section and on said closure in heat conducting relationship therewith, a spring loaded valve in said cylinder, means for reciprocating said piston in said cylinder through at least one intake and at least one compression stroke to fill said cylinder with a charge of gas from the surrounding atmosphere, said piston reciprocating means comprising an electric motor coupled to said piston through a Scotch yoke, cam means driven by said electric motor to normally hold said valve in an open position and to permit closure of said valve upon commencement of the last compression stroke, a light source having the light therefrom directed upon said mirror, a photoelectric cell in the path of light rays reflected from said mirror, an amplifier in the output circuit of said photoelectric cell, a thyratron tube in the output of said amplifier, a relay in the plate circuit of said thyratron tube, an indicating means comprising a scale, an indicator arm movable over said scale, said arm being rotatably mounted on a shaft and an electromagnetic coupling to couple said arm to said shaft, said coupling means being connected in the circuit of said relay, said shaft being driven by said Scotch yoke, a clock motor having cams on the shaft thereof, contacts mounted on said shaft for periodically completing a circuit for energizing said light source, a second circuit for supplying plate voltage to said thyratron tube, and a third circuit for energizing said piston driving electric motor, electrical contacts operated by said piston driving motor, said contacts being arranged to reverse the direction of said motor as the piston nears the extreme of movement in a compression stroke, and a friction sleeve driven by said motor operated in either direction, said friction sleeve bearing against and holding closed a pair of contacts in the circuit of said motor while said motor operates the piston in a compressing direction, said sleeve permitting said contacts to open upon reversal of direction of motor operation to thereby deenergize said motor.

10. A device as claimed in claim 9, characterized in that firing of said thyratron tube operates said relay and opens the circuit of said electromagnetic coupling means to thereby position said indicating arm on the scale in accordance with the position of said piston when moisture forms upon said mirror.

11. A device as claimed in claim 10, characterized in that said clock driven cams operates subsequently to the positioning of said indicator arm and the stoppage of said piston driving motor to de-energize said light source, said thyratron, and said piston driving motor.

12. In a device for automatically indicating the relative humidity of a gaseous atmosphere, in combination, a compression cylinder, a piston reciprocable in said cylinder, a relief valve for said cylinder, automatic means for reciprocating said piston in said cylinder through at least one intake and at least one compression stroke to fill said cylinder with a charge of gas from the surrounding atmosphere, means to normally hold said valve in open position, means to close said valve upon commencement of the last compression stroke, indicating means, means for coupling said indicating means with said piston for movement therewith, means mounted in said cylinder in heat exchange relationship with the external atmosphere and having a surface for the formation of water vapor thereon, and means connected in an electric circuit including said last means and said coupling means for de-energizing said coupling means upon the formation of water vapor upon said surface.

References Cited in the file of this patent

UNITED STATES PATENTS

| | | |
|---|---|---|
| 1,883,116 | Tomlinson | Oct. 18, 1932 |
| 2,371,511 | Faus | Mar. 13, 1945 |
| 2,449,283 | Dike et al. | Sept. 14, 1948 |
| 2,566,307 | Boyle | Sept. 4, 1951 |
| 2,662,393 | Rzasa | Dec. 15, 1953 |
| 2,715,836 | Brady | Aug. 23, 1955 |